July 25, 1967   H. S. VAN BUREN, JR   3,332,655
SHELF SUPPORT FASTENER
Filed Nov. 2, 1965
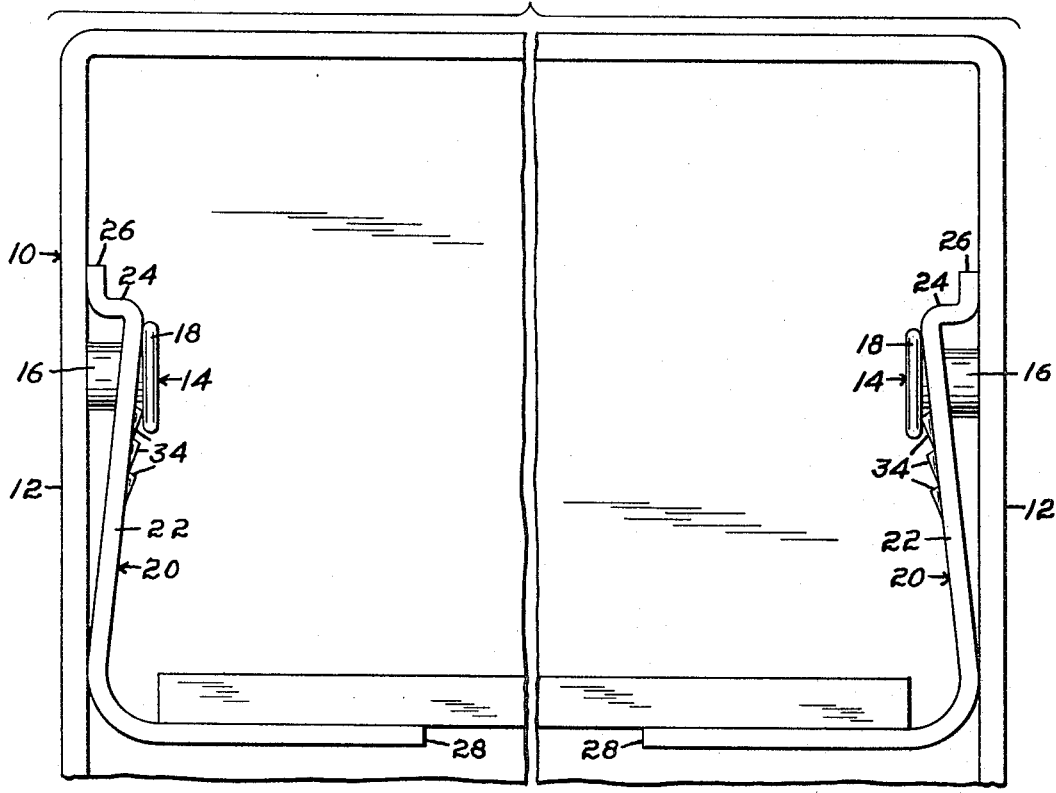
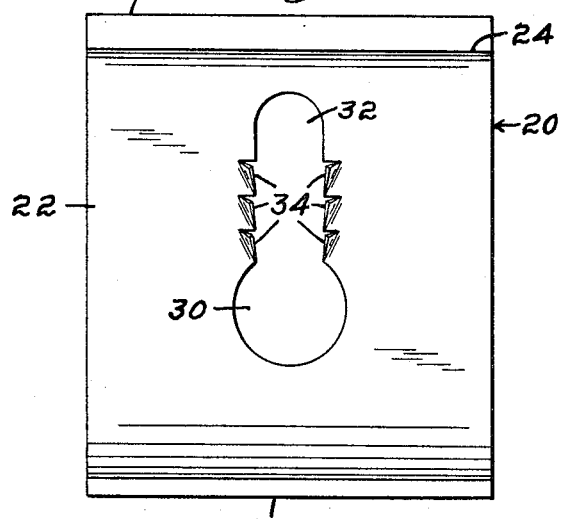
Inventor:
Harold S. van Buren Jr.,
by Gordon Needleman
Atty.

United States Patent Office 3,332,655
Patented July 25, 1967

3,332,655
SHELF SUPPORT FASTENER
Harold S. Van Buren, Jr., Cambridge, Mass., assignor to United-Carr Incorporated, Boston, Mass., a corporation of Delaware
Filed Nov. 2, 1965, Ser. No. 506,025
3 Claims. (Cl. 248—235)

This invention relates generally to fastening devices and more specifically to a retainer or socket member to be engaged to a stud.

An object of the present invention is to provide a retainer for engagement with a stud which is secured to a support without forming holes or apertures in the support.

Another object of the present invention is to provide a stud element for engagement with a metal support and a retainer member which may be slidably engaged with the stud element for holding a shelf or the like.

Other objects of the invention will, in part, be obvious and will, in part, appear hereinafter.

In the drawings:
FIG. 1 is a side elevation of the shelf assembly.
FIG. 2 is a top plan view of the adapter.

There is shown in the drawings a rectangular support such as would be found in a cabinet, i.e., kitchen cabinets, in book cases or in other articles which require shelving adjustable or otherwise. The support 10 includes a pair of side walls 12 formed of either a metal or plastic material. The side walls 12 being in spaced relation to each other.

A stud 14 comprises a shank portion 16 and an enlarged head portion 18 integral with the outer end of the shank portion 16 as shown in FIG. 1. The other end of the shank portion 16 from the head portion 18 is adapted to be welded or otherwise fastened to the inside surface of each of the side walls 12. The attachment between the shank portion 16 and the side wall 12 is accomplished without forming any apertures or holes through the side wall 12.

An adapter 20 formed of a resilient material includes a body portion 22, which is substantially rectangular in configuration, having an integral leg portion 24 extending from one end thereof. The free terminal ends of the leg portion 24 is bent to provide a support engaging portion 26 which is in substantially right angle relationship with the leg portion 24. The opposite end of the body portion 22 is bent in a direction opposite to the leg portion 24 and in substantially spaced parallel relationship therewith. The body portion 22 is angled from its connection with the leg portion 24 to the shelf-engaging portion 28. A keyhole slot 30 is formed through the body portion 22, along the long length thereof, with its larger circular aperture closer to the shelf-engaging portion 28 than to the leg portion 24. The side walls of the leg or rectangular portion 32 are each provided with spaced, rectangular, flexible teeth 34. The teeth 34 have free terminal ends directed away from the plane of the shelf-engaging portion 28 and extend above the upper surface of the body portion 22 as shown in FIG. 1. In the embodiment shown there are three pairs of teeth 34. Each pair of teeth 34 being set in opposed relationship to each other as well as being in spaced relationship to the other pairs of teeth.

The stud 14 is engaged to the side wall 12 by welding, soldering or adhesively securing its end remote from the head portion 18. The head portion 18 has a smaller width or diameter than the diameter of the circular aperture in the keyhole slot 30. The head portion 18 is then passed through the circular aperture in the keyhole slot 30 placing the head portion 18 in superposed relationship to the outer surface of the body portion 22. At this juncture, the line of connection between the shelf-engaging portion 28 and the body portion 22 as well as the support engaging portion 26 is in abutting relation to the inner surface of the side wall 12 within the support engagement portion 26 in the uppermost position. The adapter 20 is now pushed downwardly so that the shank portion 16 passes between the walls of the leg 32 of the keyhole slot 30 and the head portion 18 overlies the portions of the body portion 22 adjacent to the leg or rectangular opening of the keyhole slot 30. The cylindrical shank portion 16 has a slightly greater width or diameter than the width between the walls of the leg 32 of the keyhole slot 30, thereby providing an interference fit. The head portion 18 may be passed over the pairs of teeth 34 to the required adjustable position and the fact that the body portion in effect, provides a ramp creates a tensioning force between the adapter, the support and the stud. The teeth 34 can flex toward the body portion 22 thus allowing passage of the head portion 18. Bosses may be substituted for teeth if required. Bosses would allow the adapter to be removed. The adapter 20 is thus held in tight engagement with the stud and with the support. The appropriate teeth 34 would engage against the shank 16 and at the uppermost level of the ramp formed by the body portion 22 against the under surface of the head portion 18. The body portion 22 may be angled to form a ramp which would create a tensioned relationship between the head portion 18, the body portion 22 and the side wall 12.

With reference to the foregoing description it is to be understood that what has been disclosed therein represents only a single embodiment of the invention and is to be construed as illustrative rather than restrictive in nature; and that the invention is best described by the following claims.

I claim:
1. The combination of a fastening device and a support, said fastening device comprising an adapter and a stud, said adapter comprising a body portion having two ends, an upper surface and having a keyhole slot formed therethrough, said keyhole slot including a wide portion and a long narrow portion, a series of flexible projections on each side of said narrow portion, a leg portion extending from the end of said body portion remote from said wide portion of said keyhole slot and having a terminal portion at said other end of said body portion bent to provide an article holding means, said stud comprising a shank portion extending from a head portion, said shank portion having an inner end, said stud secured at the inner end of said shank to said support without perforation of said support and said head portion overlying a portion of said body portion adjacent said long narrow portion of said keyhole slot, said terminal portion of said leg portion abutting said support and said body portion forming an acute angle with said support.

2. A combination of a fastening device and a support, said fastening device comprising an adapter and a stud, said adapter comprising a body portion having two ends, an upper surface, and having a keyhole slot formed therethrough, a leg portion extending from one of said ends of said body portion and said leg portion having a terminal portion and said other end of said body portion having an article supporting means associated therewith, said stud comprising a head portion having a shank portion extending therefrom, said shank portion having an inner end, said stud secured at the inner end of said shank to said support without perforation of said support and said head portion overlying a portion of said body portion adjacent said keyhole slot said terminal portion of said leg abutting said support and said body portion forming an acute angle with said support.

3. A combination of at least two fastening devices, and an article to be held in a support, each of said fastening devices comprising an adapter and a stud, said adapter comprising a body portion having two ends, an upper surface, and having a keyhole slot formed therethrough, said keyhole slot including a wide portion and a long, narrow portion, a series of flexible projections on each side of said narrow portion, a leg portion extending from the end of said body portion remote from said wide portion of said keyhole slot and having a terminal portion and said other end of said body portion bent to provide an article holding means each of said studs comprising a shank portion extending from the head portion said shank portion having an inner end, said support having at least two side walls in opposed spaced relation to each other, one of said studs secured to each of said side walls at the inner end of said shank without perforation of said side walls and said head portion overlying a portion of said body portion adjacent said long, narrow portion of said keyhole slot, said terminal portion of said leg abutting said side wall and said body portion forming an acute angle with said side wall and said article to be engaging each of said article holding means.

References Cited

UNITED STATES PATENTS 2,000,451   5/1935   Krieger _____ 108—107 X

FOREIGN PATENTS 696   1/1889   Great Britain.
89,117   4/1957   Norway.

ROY D. FRAZIER, *Primary Examiner.*

F. DOMOTOR, *Assistant Examiner.*